United States Patent
Wang et al.

(10) Patent No.: US 7,880,437 B2
(45) Date of Patent: Feb. 1, 2011

(54) QUICK CONDITIONING MEMORY BACKUP BATTERY

(75) Inventors: Ligong Wang, Round Rock, TX (US); Bobby Rogers, Jarrell, TX (US); Marcelo Vinante, Round Rock, TX (US); Shane Chiasson, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 711 days.

(21) Appl. No.: 11/960,976

(22) Filed: Dec. 20, 2007

(65) Prior Publication Data

US 2009/0160402 A1    Jun. 25, 2009

(51) Int. Cl.
*H01M 10/46* (2006.01)
(52) U.S. Cl. ...................................... 320/131
(58) Field of Classification Search .............. 320/107, 320/125, 127, 128, 130, 131, 132, 134, 136, 320/149
See application file for complete search history.

(56) References Cited

U.S. PATENT DOCUMENTS

| | | | |
|---|---|---|---|
| 6,307,349 B1 * | 10/2001 | Koenck et al. | ............ 320/112 |
| 6,732,241 B2 | 5/2004 | Riedel | |
| 7,007,183 B2 | 2/2006 | Rawson, III | |
| 7,032,119 B2 | 4/2006 | Fung | |
| 2004/0262997 A1 * | 12/2004 | Gull et al. | ............ 307/64 |
| 2005/0060590 A1 | 3/2005 | Bradley | |

* cited by examiner

*Primary Examiner*—Edward Tso
(74) *Attorney, Agent, or Firm*—Hamilton & Terrile, LLP; Stephen A. Terrile

(57) ABSTRACT

A quick conditioning cycle system to avoid performance degradation at the end of calibrating cycle. The quick conditioning cycle system discharges a battery to a level where battery remaining capacity is still high enough to backup memory at a guaranteed period of time. During the quick learning cycle, the battery pack is discharged from a full charge. If measured capacity exceeds a predetermined threshold (Cpc), calibration stops. Otherwise, the quick conditioning cycle system reports a defected battery when measured capacity is less than Cpc and continues discharging to a full conditioning cycle, if desired.

21 Claims, 4 Drawing Sheets

QUICK CONDITIONING MEMORY BACKUP BATTERY

BACKGROUND OF THE INVENTION

1. Field of the Invention

The present invention relates to information handling systems and more particularly to quick conditioning memory backup battery.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide backup power to an information handling system via a battery pack. For example with the PowerEdge Expandable redundant array of inexpensive disks (RAID) Controller (PERC) available from Dell, Inc., a battery pack is used to backup memory, (such as a dirty cache memory located on PERC expansion card) when AC power is lost. One issue relating to the battery pack is related to gas gauge accumulated errors over time or cell failure. Due to this issue, it is often necessary to perform a learning cycle during which the battery is fully discharged to 3V and recharged again. The remaining capacity of the battery pack reported by the gas gauge is monitored by the RAID firmware (FW). In certain PERC systems, if the capacity of the battery pack drops below a certain threshold such as a 40% relative state of charge (RSOC) threshold, the firmware switches the write-cache policy of the system to a Write-through cache policy. The threshold may be selected based upon certain performance considerations (e.g., the threshold may be based upon a battery pack capacity needed to protect the cache memory for twenty-four hours). When the capacity rises above the threshold, the firmware re-enables a Write-back cache policy.

There are a number of issues relating to battery pack capacity. For example, during the learning cycle, the performance of the system can be negatively affected as the write cache policy is changed to write-through once the battery capacity is below a certain threshold, e.g. 40% RSOC, in this case. The learning cycle window is generally predictable, but can be bigger depending on the temperature in the system. For example, in certain systems, logic in the battery pack will not allow a charge if the temperate reaches or surpasses 65 C. Also, because of cell degradation, a certain threshold that is identified during the design of the system may not be not enough to meet the minimum capacity requirement to protect the data in cache memory for up to twenty-four hours.

For example, FIG. 1, labeled Prior Art, shows a conditioning cycle for a battery pack used with a PERC system. The capacity of the battery pack degrades over time. Additionally, the performance of the PERC system is degraded, as indicated by the diagonal lines, due to the unavailability of the battery pack for memory backup.

SUMMARY OF THE INVENTION

In accordance with the present invention, to avoid performance degradation at the end of calibrating cycle, a quick conditioning cycle system is set forth. The quick conditioning cycle system discharges the battery to a level where battery remaining capacity is still high enough to backup memory at a guaranteed period of time. During the quick learning cycle, the battery pack is discharged from a full charge. If measured and calculated capacity (e.g., in Watt hour (Whr)) exceeds a predetermined threshold ($C_{pc}$) (e.g., >50% RSOS which in one embodiment corresponds to 2 Whr with a cut off voltage of 3.8V), calibration stops. Otherwise, the quick conditioning cycle system reports a defected battery when measured capacity is less than $C_{pc}$ and continues discharging to a full conditioning cycle (e.g., a cut off voltage of 3.0V), if desired. Additionally, the quick conditioning cycle system eliminates a fixed predetermined RSOC threshold requirement as this requirement could cause lower-than-required capacity on aged pack.

Thus, the present invention makes use of a minimum remaining capacity in addition to a mid-way checkpoint, e.g. voltage, to accelerate the conditioning procedure of a battery. The present invention thus provides an advantage in a server or storage system environment in which the conditioning of the battery affects the performance of the system.

In one embodiment, the invention relates to a method for quick conditioning of a battery that includes determining whether a battery has a capacity that satisfies a desired memory backup capacity and when the battery comprises the capacity, performing a quick conditioning cycle on the battery. The quick conditioning cycle discharges the battery to a level where the remaining capacity of the battery is high enough to backup memory for a desired period of time.

In another embodiment, the invention relates to an apparatus for quick conditioning of a battery which includes means for determining whether a battery has a capacity that satisfies a desired memory backup capacity and means for when the battery comprises the capacity, performing a quick conditioning cycle on the battery. The quick conditioning cycle discharges the battery to a level where the remaining capacity of the battery is high enough to backup memory for a desired period of time.

In another embodiment, the invention relates to an information handling system that includes a processor, memory coupled to the processor and a battery coupled to the memory. The battery includes a battery management unit and battery firmware. The battery firmware stores code executable by the battery management unit for determining whether a battery has a capacity that satisfies a desired memory backup capacity, and when the battery comprises the capacity, performing a quick conditioning cycle on the battery wherein the quick conditioning cycle discharges the battery to a level where the remaining capacity of the battery is high enough to backup memory for a desired period of time.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
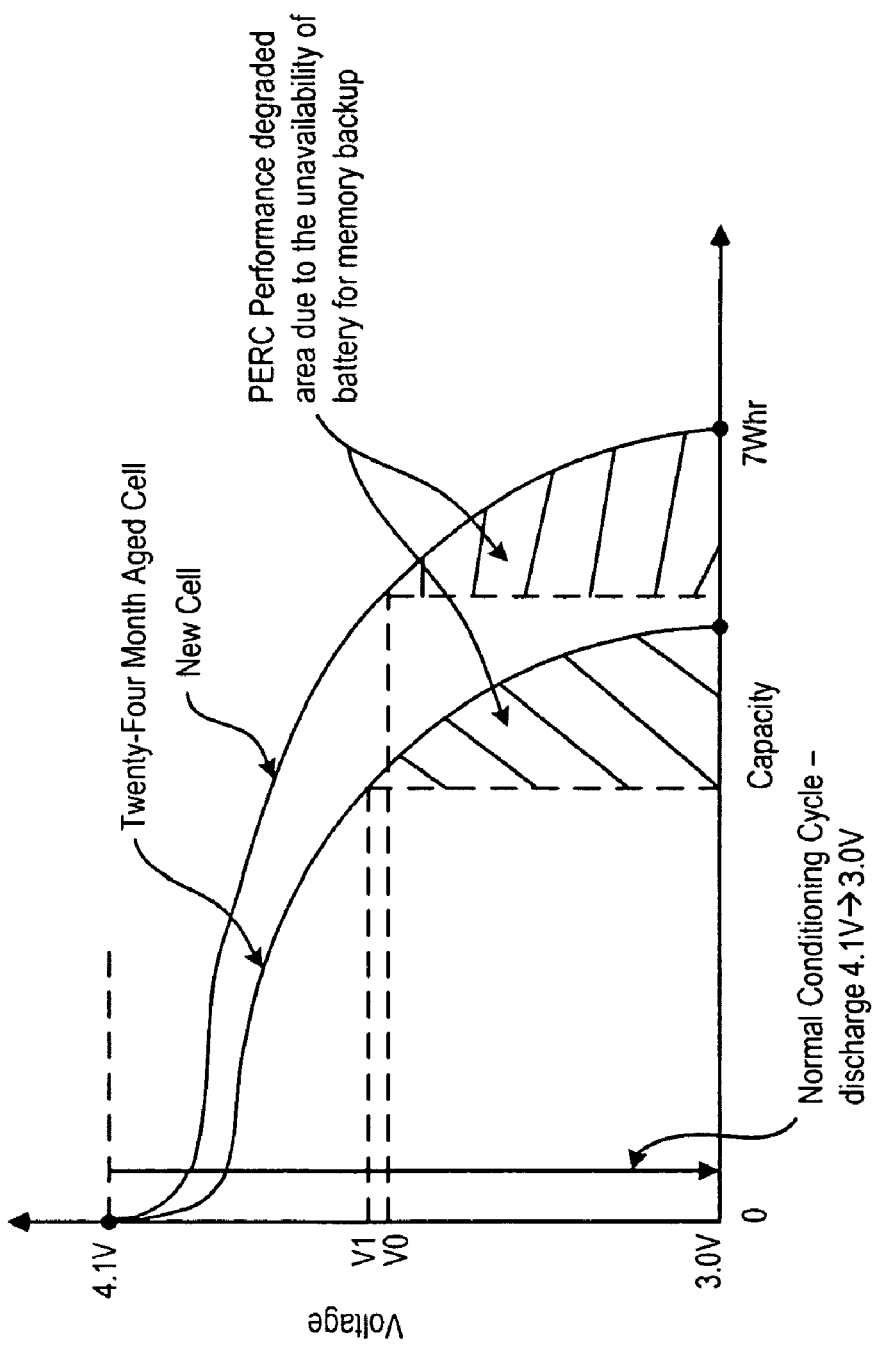
FIG. 1, labeled Prior Art, shows a normal conditioning cycle.
Figure 2:
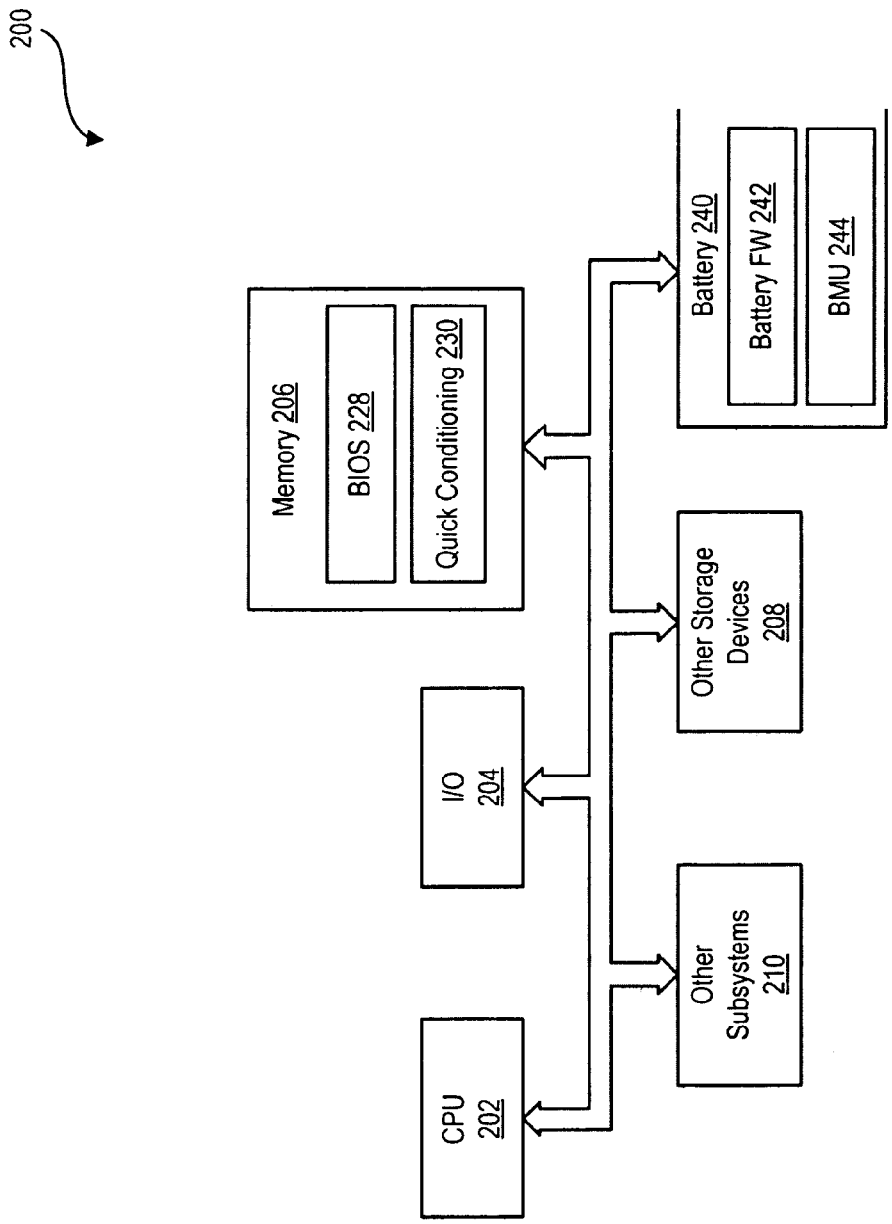
FIG. 2 shows a system block diagram of an information handling system.

Referring briefly to FIG. 2, a system block diagram of an information handling system 200 is shown. The information handling system 200 includes a processor 202, input/output (I/O) devices 204, such as a display, a keyboard, a mouse, and associated controllers, memory 206, including volatile memory such as random access memory (RAM) and non-volatile memory such as read only memory (ROM) and hard disk drives, and other storage devices 208, such as a floppy disk and drive or CD-ROM disk and drive, and various other subsystems 210, all interconnected via one or more buses 212. The memory 206 includes a basic input output system 228 as well as a quick conditioning cycle module 230. The information handling system 200 also includes a battery 240 coupled via the bus 212. The battery 240 includes battery firmware 242 as well as a battery management unit (BMU) 244. The battery 240 may include one or more battery cells. Additionally, the term battery refers to a single battery or to a battery pack.

The quick conditioning cycle module 230 enables the information handling system 200 to avoid performance degradation at the end of calibrating cycle. The quick conditioning cycle module 230 discharges the battery 240 to a level where battery remaining capacity (as measured and calculated by the BMU 244 in Watt hours (Whrs)) is still high enough to backup memory at a preferred period of time, e.g. 2.8 Whr at PERC6 for 24 hours. During the quick learning cycle, the battery pack is discharged from a full charge, normally at 4.1V, to Vpc (which in one embodiment is higher than 3.8 V). If measured capacity exceeds a predetermined threshold (Cpc), calibration stops. Otherwise, the quick conditioning cycle module 230 reports a defected battery when measured capacity is less than Cpc or/and continues discharging to a full conditioning cycle, if desired. Additionally, the quick conditioning cycle module 203 eliminates a fixed predetermined RSOC threshold requirement as this requirement could cause lower-than-required capacity on aged pack.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a network storage device or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

In certain embodiments, the quick conditioning cycle is predefined to improve system performance and customer satisfaction. As this function works independently from regular full charge/discharge conditioning cycle, a battery pack which includes quick conditioning cycle functionality is completely backward compatible with preexisting systems which do not support the quick conditioning, cycle functionality.

Figure 3:
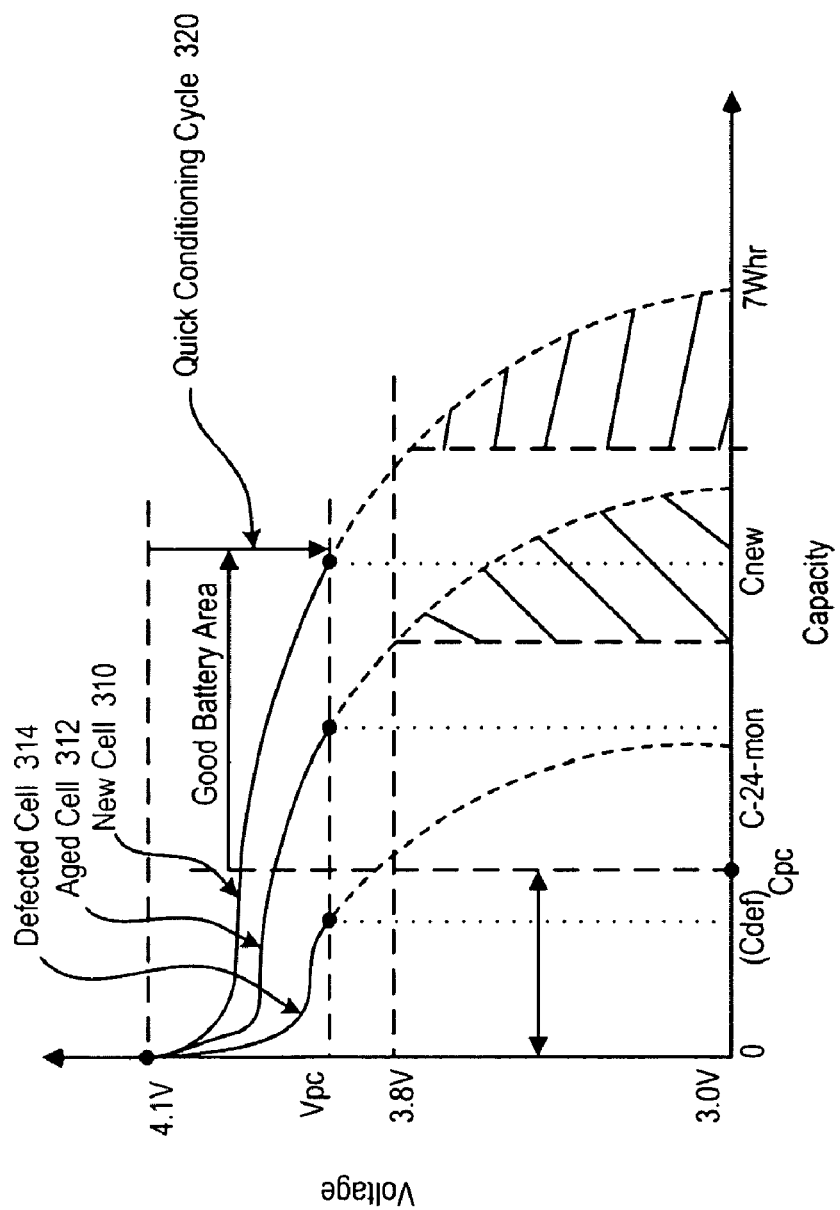
FIG. 3 shows a quick conditioning cycle.

Referring to FIG. 3, a quick conditioning cycle is shown. More specifically, with the quick conditioning cycle 300, the quick conditioning system makes use of a quick conditioning cycle when the battery 340 is functioning within predefined known good conditions. The quick conditioning cycle shows a sample battery discharge for a new cell 310, for an aged (e.g., for a 24 month old) battery cell 312 and for a defected battery cell 314.

With the quick conditioning cycle 320, the battery 240 is discharged to a precondition voltage (Vpc) which in certain embodiments corresponds to approximately 3.8 Volts (±0.2 Volts) as long as the battery capacity is greater than a predefined capacity Cpc. Thus, when the capacity is greater than the predefined capacity and the voltage of the battery is greater than the precondition voltage, conditioning of the battery 340 is maintained via a quick conditioning cycle 320.

Figure 4:
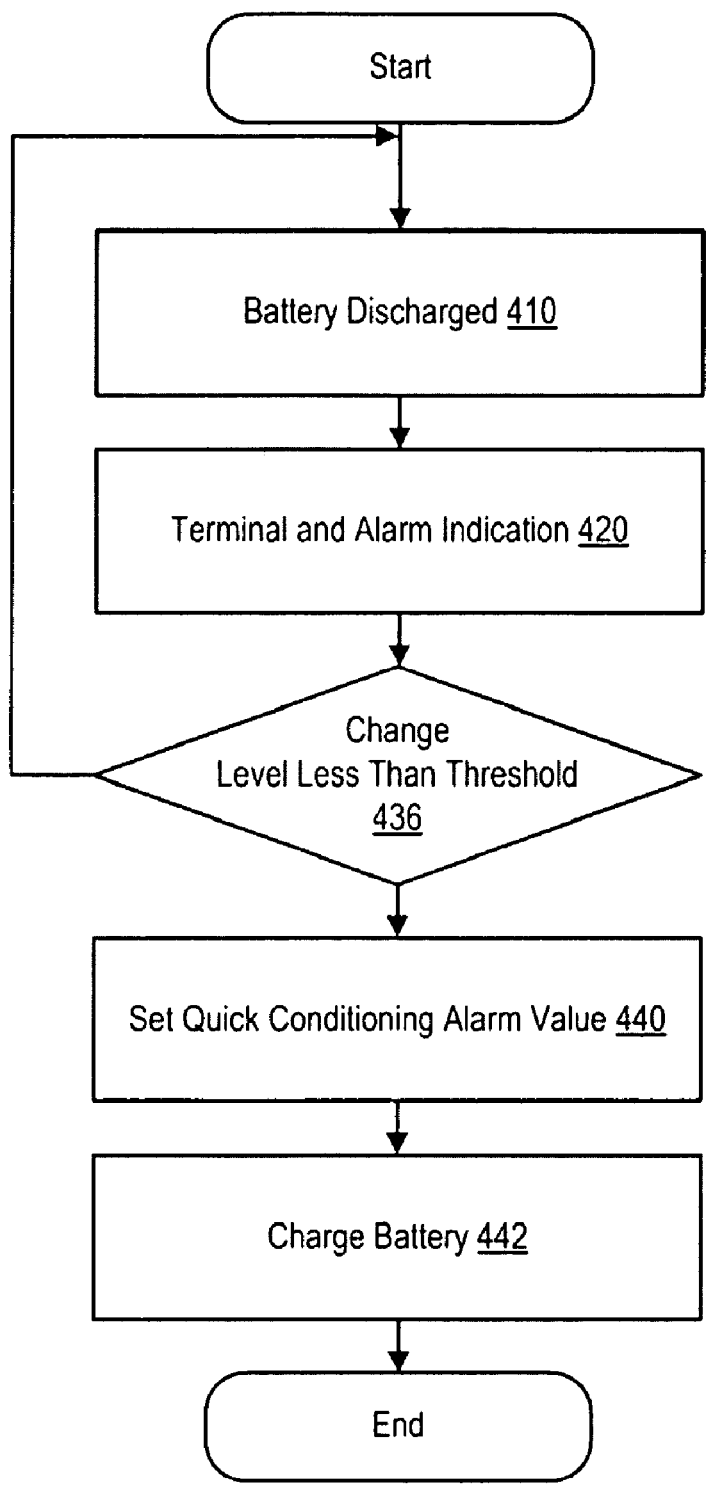
FIG. 4 shows a flow chart of the operation of a quick conditioning system.

Referring to FIG. 4, a flow chart of the operation of a quick conditioning system is shown. More specifically, when the battery is operating within a quick conditioning cycle mode of operation, the battery 340 is discharged to a predefined voltage level at step 410. The predefined voltage level is configurable to allow the battery 240 to maintain a preferred capacity. In certain embodiments, the preferred capacity is a battery capacity that provides for backup of the memory for a desired amount of time (e.g., a capacity of 2.8 Whr).

When the battery is discharged, a terminate alarm indication is set at step 420. The terminate alarm value is cleared when a predetermined charge current (e.g., a charge of 150 mA or higher charge current) is detected.

If the measured capacity of the battery 240 from full charge to the predetermined charge level is less than a designated threshold as determined at step 436, then a quick conditioning alarm value is set at step 440. The quick conditioning alarm value indicates that a quick conditioning cycle should not be performed. The quick conditioning alarm value is not cleared once set. The battery is charged back to a full voltage at step 442.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for quick conditioning of a battery comprising:
   determining whether a battery has a capacity that satisfies a desired memory backup capacity; and
   when the battery comprises the capacity, performing a quick conditioning cycle on the battery, the quick conditioning cycle discharging the battery to a level where remaining capacity of the battery is high enough to backup memory for a desired period of time.

2. The method of claim 1 wherein:
   during the quick learning cycle, the battery is discharged from a full charge; and,
   if a measured capacity exceeds a predetermined threshold (Cpc), calibration stops and the battery is charged back to a full charge capacity.

3. The method of claim 2 further comprising:
   if a measured capacity does not exceed the predetermined threshold (Cpc), generating a defected battery indication when a measured capacity is less than Cpc.

4. The method of claim 2 further comprising:
   if a measured capacity does not exceed the predetermined threshold (Cpc), discharging the battery to perform a full conditioning cycle.

5. The method of claim 1 wherein:
   the voltage level is configurable to allow the battery to maintain a preferred capacity, the preferred capacity comprising a battery capacity that provides for backup of a memory within a system for a desired amount of time.

6. The method of claim 2 further comprising:
   generating a quick conditioning alarm value if the measured capacity of the battery from a full charge to the predetermined charge level is less than a designated threshold, the quick conditioning alarm value indicating that a quick conditioning cycle should not be performed.

7. The method of claim 1 wherein:
   the capacity is measured in Watt hours (Whr); and,
   the level where remaining capacity of the battery is high enough to backup memory for a desired period of time corresponds to greater than 50 percent of a relative state of charge or 40 percent of absolute state of charge in terms of design capacity, whichever is higher.

8. An apparatus for quick conditioning of a battery comprising:
   means for determining whether a battery has a capacity that satisfies a desired memory backup capacity;
   means for when the battery comprises the capacity, performing a quick conditioning cycle on the battery, the quick conditioning cycle discharging the battery to a level where remaining capacity of the battery is high enough to backup memory for a desired period of time.

9. The apparatus of claim 8 wherein:
   during the quick learning cycle, the battery is discharged from a full charge; and,
   if a measured capacity exceeds a predetermined threshold (Cpc), calibration stops and the battery is charged back to a full charge capacity.

10. The apparatus of claim 9 further comprising:
    means for generating a defected battery indication when a measured capacity is less than the predetermined threshold Cpc if a measured capacity does not exceed the predetermined threshold (Cpc).

11. The apparatus of claim 9 further comprising:
    means for discharging the battery to perform a full conditioning cycle if a measured capacity does not exceed the predetermined threshold (Cpc).

12. The apparatus of claim 8 wherein:
    the voltage level is configurable to allow the battery to maintain a preferred capacity, the preferred capacity comprising a battery capacity that provides for backup of a memory within a system for a desired amount of time.

13. The apparatus of claim 9 further comprising:
    means for generating a quick conditioning alarm value if the measured capacity of the battery from a full charge to the predetermined charge level is less than a designated threshold, the quick conditioning alarm value indicating that a quick conditioning cycle should not be performed.

14. The apparatus of claim 8 wherein:
    the capacity is measured in Watt hours (Whr); and,
    the level where remaining capacity of the battery is high enough to backup memory for a desired period of time corresponds to greater than 50 percent of a relative state of charge or 40 percent of absolute state of charge in terms of design capacity, whichever is higher.

15. An information handling system comprising:
    a processor;
    memory coupled to the processor;
    a battery coupled to the memory, the battery comprising a battery management unit and battery firmware, the battery firmware storing code executable by the battery management unit for:
       determining whether a battery has a capacity that satisfies a desired memory backup capacity; and
       when the battery comprises the capacity, performing a quick conditioning cycle on the battery, the quick conditioning cycle discharging the battery to a level where remaining capacity of the battery is high enough to backup memory for a desired period of time.

16. The information handling system of claim 15 wherein:
    during the quick learning cycle, the battery is discharged from a full charge; and,
    if a measured capacity exceeds a predetermined threshold (Cpc), calibration stops and the battery is charged back to a full charge capacity.

17. The information handling system of claim 16 wherein the battery firmware further comprises code for:
   if a measured capacity does not exceed the predetermined threshold (Cpc), venerating a defected battery indication when a measured capacity is less than Cpc.

18. The information handling system of claim 16 wherein the battery firmware further comprises code for:
   if a measured capacity does not exceed the predetermined threshold (Cpc), discharging the battery to perform a full conditioning cycle.

19. The information handling system of claim 15 wherein:
   the voltage level is configurable to allow the battery to maintain a preferred capacity, the preferred capacity comprising a battery capacity that provides for backup of a memory within a system for a desired amount of time.

20. The information handling system of claim 16 wherein the battery firmware further comprises code for:
   generating a quick conditioning alarm value if the measured capacity of the battery from a full charge to the predetermined charge level is less than a designated threshold, the quick conditioning alarm value indicating that a quick conditioning cycle should not be performed.

21. The information handling system of claim 15 wherein:
   the capacity is measured in Watt hours (Whr); and,
   the level where remaining capacity of the battery is high enough to backup memory for a desired period of time corresponds to greater than 50 percent of a relative state of charge or 40 percent of absolute state of charge in terms of design capacity, whichever is higher.

* * * * *